(12) United States Patent
Chen et al.

(10) Patent No.: US 10,425,199 B2
(45) Date of Patent: Sep. 24, 2019

(54) EFFICIENT HANDLING OF CONTROL SUBBANDS IN MULTIPLE COMPONENT CARRIER CONFIGURATIONS

(71) Applicant: QUALCOMM Incorporated, San Diego, CA (US)

(72) Inventors: Wanshi Chen, San Diego, CA (US); Jing Sun, San Diego, CA (US); Tingfang Ji, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 136 days.

(21) Appl. No.: 15/621,302

(22) Filed: Jun. 13, 2017

(65) Prior Publication Data

US 2018/0131479 A1    May 10, 2018

Related U.S. Application Data

(60) Provisional application No. 62/417,672, filed on Nov. 4, 2016.

(51) Int. Cl.
| | |
|---|---|
| *H04L 12/50* | (2006.01) |
| *H04L 5/00* | (2006.01) |
| *H04L 1/00* | (2006.01) |
| *H04W 72/04* | (2009.01) |

(52) U.S. Cl.
CPC ........... *H04L 5/003* (2013.01); *H04L 1/0026* (2013.01); *H04L 1/0029* (2013.01); *H04L 5/001* (2013.01); *H04L 5/0053* (2013.01); *H04L 5/0094* (2013.01); *H04L 5/0098* (2013.01); *H04W 72/0406* (2013.01); *H04W 72/0453* (2013.01)

(58) Field of Classification Search
CPC ........................................................ H04L 12/50
USPC ........................................................ 370/328
See application file for complete search history.

(56) References Cited

U.S. PATENT DOCUMENTS

| | | | |
|---|---|---|---|
| 6,857,115 B1 | 2/2005 | Dasasathyan et al. | |
| 8,982,851 B2 * | 3/2015 | Agrawal | H04L 5/0048 370/335 |
| 2011/0205978 A1 | 8/2011 | Nory et al. | |
| 2016/0255611 A1 | 9/2016 | Damnjanovic et al. | |

FOREIGN PATENT DOCUMENTS

EP    2542006 A1    1/2013

OTHER PUBLICATIONS

International Search Report and Written Opinion—PCT/US2017/047760—ISA/EPO—dated Oct. 26, 2017.

* cited by examiner

*Primary Examiner* — Dang T Ton
(74) *Attorney, Agent, or Firm* — Norton Rose Fulbright LLP (57) ABSTRACT

Efficient handling of control subbands in multiple component carrier (CC) configurations is discussed. A user equipment (UE) may begin monitoring one narrowband control subband within a wider band CC. At various times, the UE may receive a dynamic activation signal that triggers the UE to begin monitoring at least another control subband. Dependent on a type of traffic state the UE is operating, when currently involved in wideband operations, the UE may be triggered to monitor one or more UE-specific control subbands within the same slot in the wider band CC.

26 Claims, 8 Drawing Sheets

EFFICIENT HANDLING OF CONTROL SUBBANDS IN MULTIPLE COMPONENT CARRIER CONFIGURATIONS

CROSS-REFERENCE TO RELATED APPLICATIONS

This application claims the benefit of U.S. Provisional Patent Application No. 62/417,672, entitled, "EFFICIENT HANDLING OF CONTROL SUBBANDS IN MULTIPLE COMPONENT CARRIER CONFIGURATIONS," filed on Nov. 4, 2016, which is expressly incorporated by reference herein in its entirety.

BACKGROUND

Field

Aspects of the present disclosure relate generally to wireless communication systems, and more particularly, to efficient handling of control subbands in multiple component carrier (CC) configurations.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes monitoring, by a user equipment (UE), a first control subband, wherein the first control subband has a bandwidth narrower than the system bandwidth (a "narrow bandwidth"), receiving a dynamic activation signal at the UE, wherein the dynamic activation signal triggers the UE to monitor at least a second control subband, and monitoring the at least the second control subband in response to the dynamic activation signal.

In an additional aspect of the disclosure, an apparatus configured for wireless communications includes means for monitoring, UE, a first control subband, wherein the first control subband has a narrow bandwidth, means for receiving a dynamic activation signal at the UE, wherein the dynamic activation signal triggers the UE to monitor at least a second control subband, and means for monitoring the at least the second control subband in response to the dynamic activation signal.

In an additional aspect of the disclosure, a non-transitory computer-readable medium having program code recorded thereon. The program code further includes code to monitor, by a UE, a first control subband, wherein the first control subband has a narrow bandwidth, code to receive a dynamic activation signal at the UE, wherein the dynamic activation signal triggers the UE to monitor at least a second control subband, and code to monitor the at least the second control subband in response to the dynamic activation signal.

In an additional aspect of the disclosure, an apparatus configured for wireless communication is disclosed. The apparatus includes at least one processor, and a memory coupled to the processor. The processor is configured to monitor, by a UE, a first control subband, wherein the first control subband has a narrow bandwidth, to receive a dynamic activation signal at the UE, wherein the dynamic activation signal triggers the UE to monitor at least a second control subband, and to monitor the at least the second control subband in response to the dynamic activation signal.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of a new radio (NR) technology. The 5G NR will be capable of scaling to: (1) provide coverage to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) include mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) include enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs allows transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Figure 1:
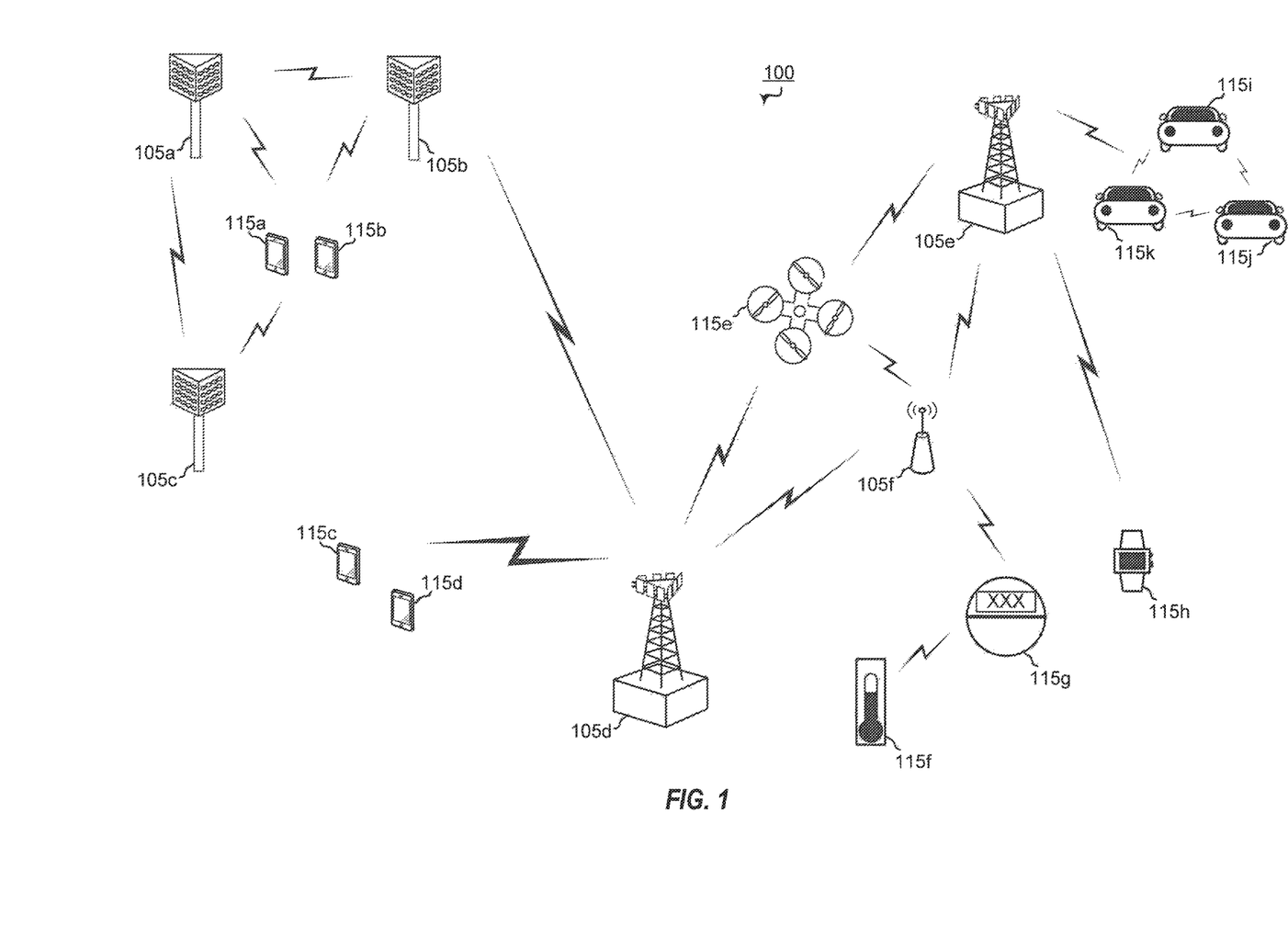
FIG. 1 is a block diagram illustrating details of a wireless communication system.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as a base station, an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. UEs 115a-115d are examples of mobile smart phone-type devices accessing 5G network 100. A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a base station (e.g., a UE and a serving base station, which is a base station designated to serve the UE on the downlink and/or uplink), transmissions between base stations, and backhaul transmissions between base stations.

In operation at 5G network 100, base stations 105a-105c serve UEs 115a and 115b using 3D beamforming and coordinated spatial techniques, such as coordinated multi-point (CoMP) or multi-connectivity. Base stations may be referred to as access points, node Bs, evolved node Bs (eNBs), next generation eNBs (gNBs), and the like. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also supports mission critical communications with ultra-reliable and redundant links for mission critical devices, such as for UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
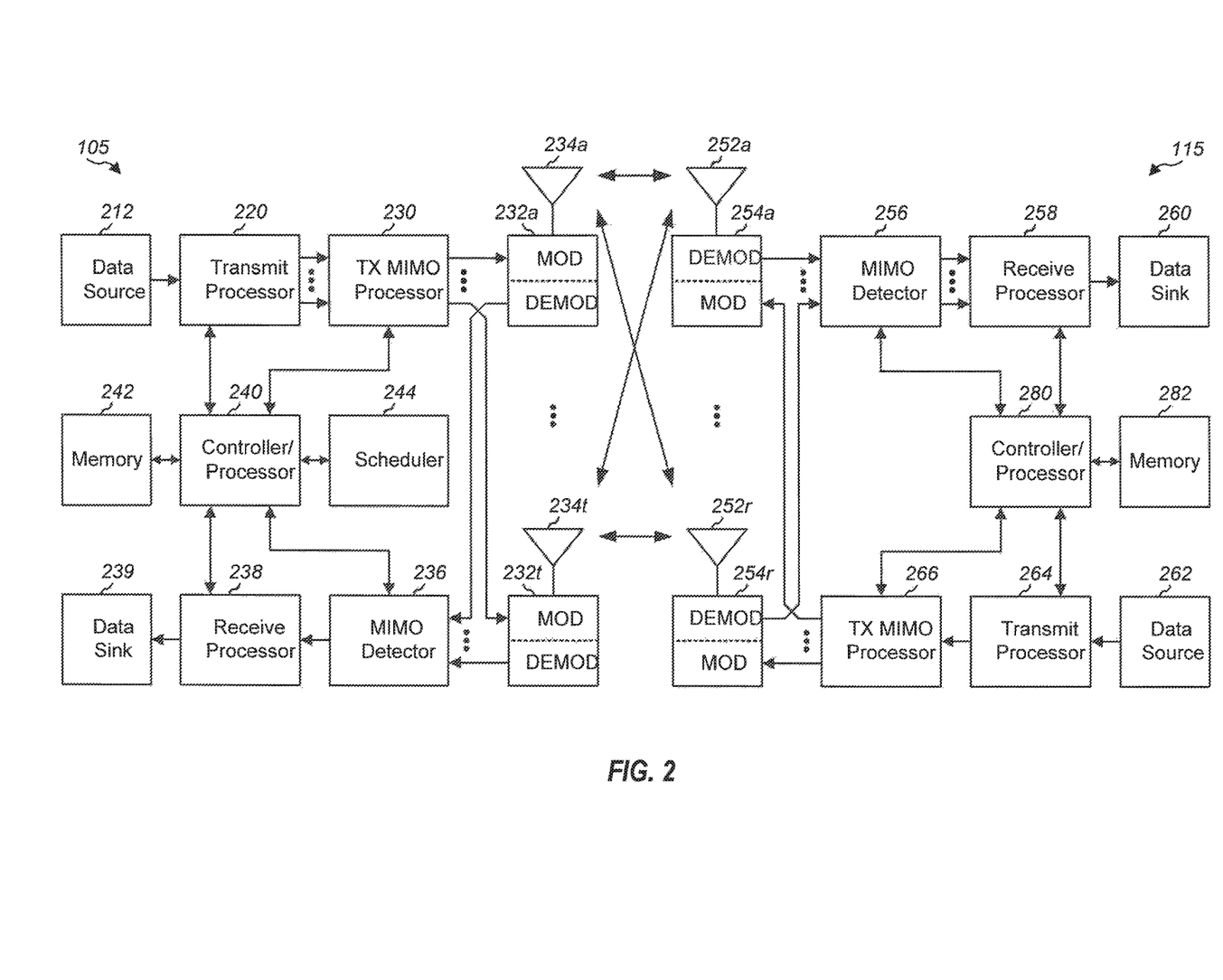
FIG. 2 is a block diagram illustrating a design of a base station and a UE configured according to one aspect of the present disclosure.

FIG. 2 shows a block diagram of a design of a base station 105 and a UE 115, which may be one of the base stations and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIG. 6, and/or other processes for the techniques described herein. The memories 242 and 282 may store data and program codes for the base station 105 and the UE 115, respectively. A scheduler 244 may schedule UEs for data transmission on the downlink and/or uplink.

Figure 3:
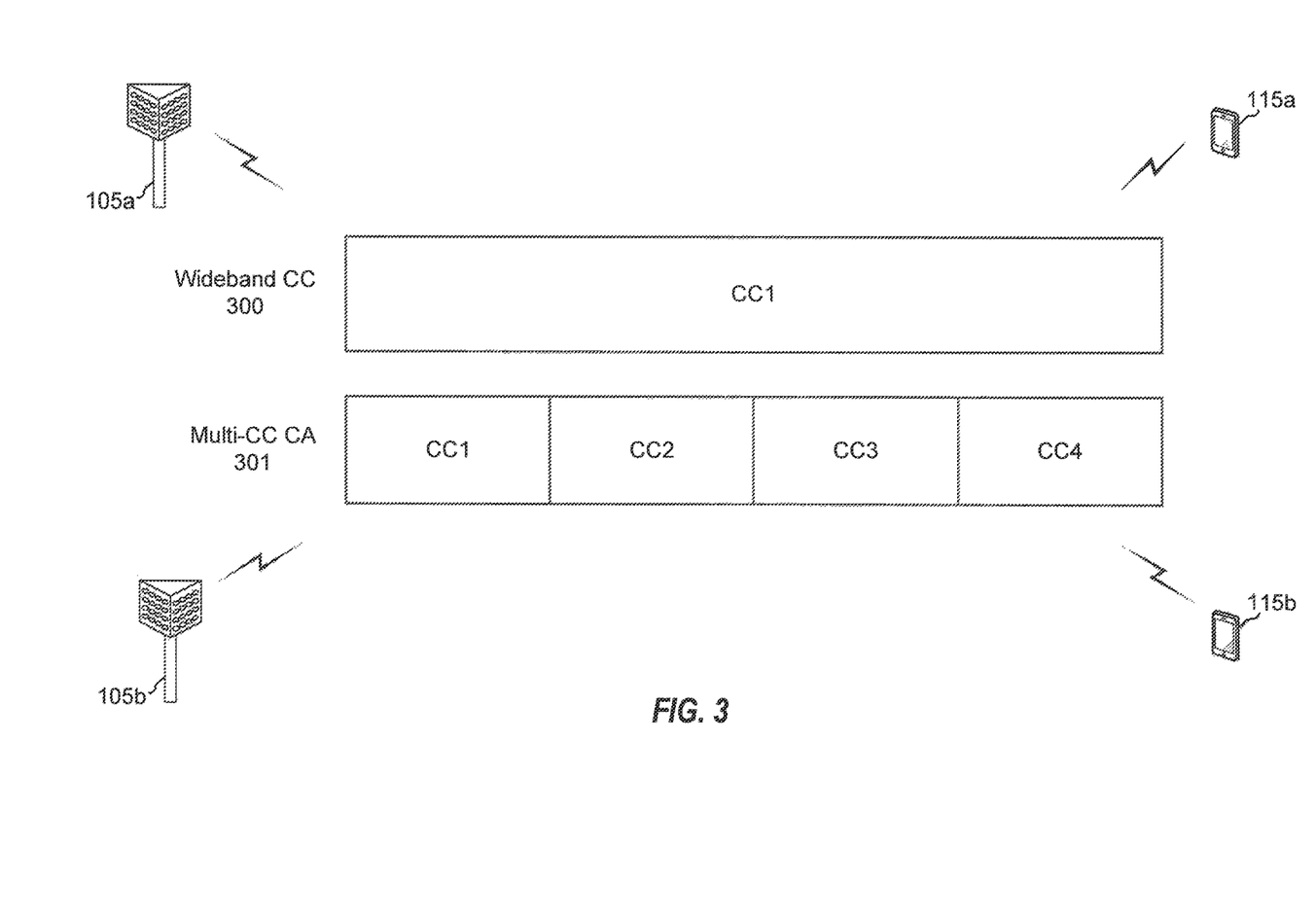
FIG. 3 is a block diagram illustrating example base stations and UEs.

FIG. 3 is a block diagram illustrating base stations 105a and 105b and UEs 115a and 115b. There are two alternative configurations for component carriers (CCs) in advanced communication systems, wideband CCs 300 or multiple, narrowband CCs 301 operated in carrier aggregation (CA), where narrowband represents a bandwidth narrower than the system bandwidth. For wideband CCs 300, multiple FFTs can still be performed in an implementation similar to narrowband CC CA 301. For example, wideband CCs 300 may be configured using a 300 kHz raster, compared to 180/240 kHz resource blocks in narrowband CC CA 301. Moreover, using such numbers, wideband CC 300 vs. narrowband CC CA 301 may comparatively provide 900 kHz for 180 kHz, 1200 kHz for 240 kHz, and the like.

Current discussions for standardizing these types of CC implementations in advanced wireless networks include studying of mechanisms to support operation over, for example, approximately 1 GHz of contiguous spectrum from both the network and UE perspectives, including a potential maximum single carrier bandwidth of at least 80 MHz. Carrier Aggregation/Dual Connectivity (Multi-carrier approach), including the potential for non-contiguous spectrum are still under discussion, as are many of the details of wideband single carrier operations. A maximum channel bandwidth continues to be studied, but eventually may result in a maximum bandwidth supported by some UE capabilities/categories, which may be less than the eventual channel bandwidth of a serving single carrier. However, it should be noted that some UE capabilities/categories may support a wider channel bandwidth of future serving single carrier operations.

Figure 4:
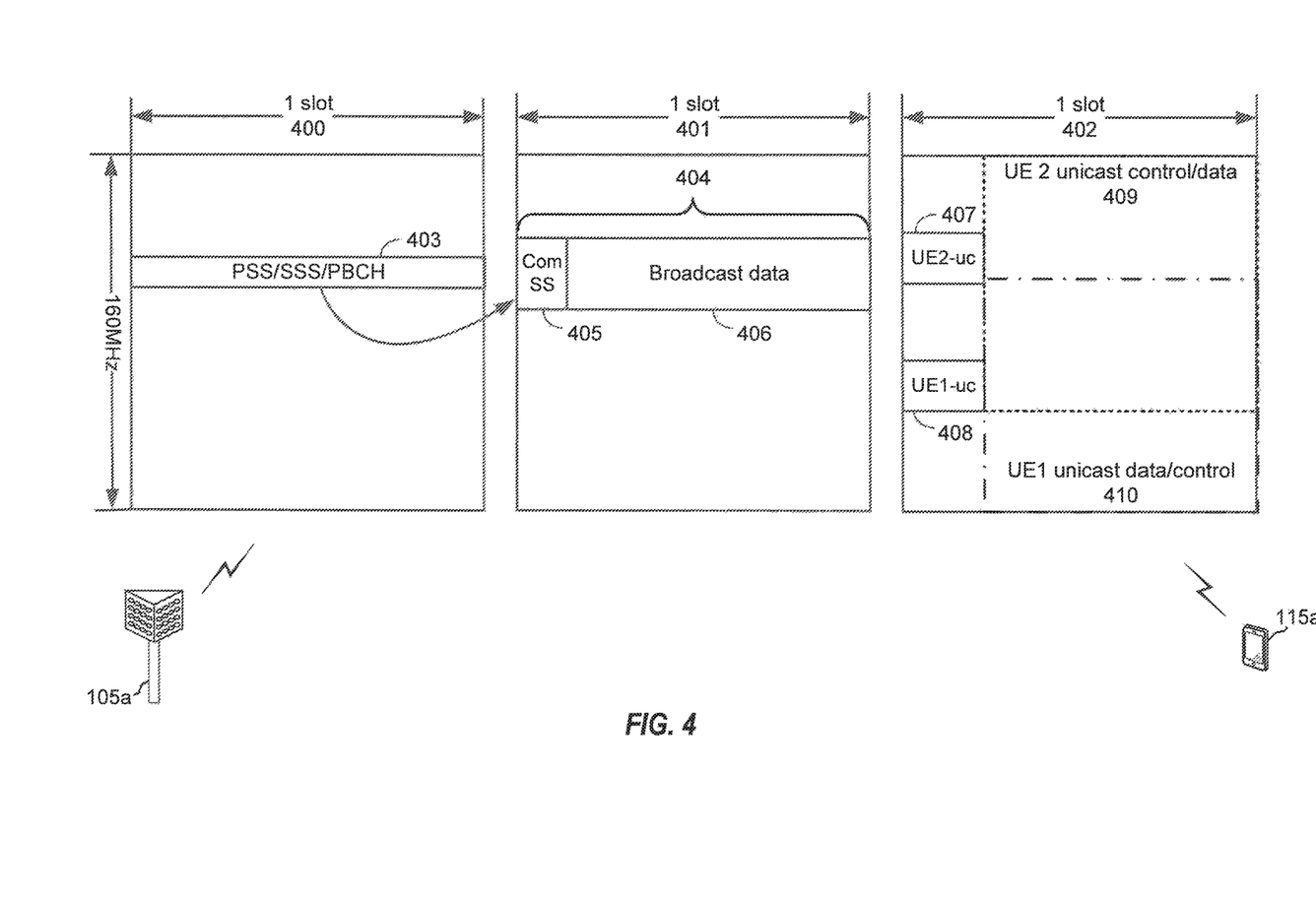
FIG. 4 is a block diagram illustrating an example base station and UE.

FIG. 4 is a block diagram illustrating a base station 105a and UE 115a. In control transmissions between base station 105a and UE 115a, base station 105a may include narrowband control signals located with the larger, wider bandwidth transmission slots. As illustrated, each of slots 400-402 include a 160 MHz bandwidth across each slot, with narrowband control messages included therein. In general consideration of narrowband control used in conjunction with wideband data, the synchronization and physical broadcast channel (PBCH) of narrowband control signal 403 may be designated in a specific location based on the synchronization channel raster in order to make it easier for UEs to locate such signals. The PBCH within narrowband control signal 403 may indicate a narrowband common control bandwidth/location of narrowband controls signal 404 of slot 401. Narrowband controls signal 404 includes a common controls signal 405 in addition to broadcast data 406. Broadcast data 406 may be transmitted in the same narrowband locations, but also may be transmitted over the wider bandwidth of slot 401 or in a different subband location. UE-specific unicast signals 407 and 408 may also be employed with narrowband control location/sizes within slot 402, while the unicast data can be transmitted via narrowband or wideband resources of slot 402 depending on the UE's capability, service needs, and the like.

Common control is generally for system information blocks (SIBs) broadcast, paging, random access procedure, groupcast (similar to single cell-point-to-multipoint (SC-PTM) communications), and the like. Locations of the common control can be in a same subband as sync/MIB. Additional or alternatively, multiple common control regions within a same wideband CC are also possible, for example, to address matters such as paging, capacity issues, and the like.

Unicast control (both in downlink and uplink) can be UE-specifically managed. Preferably the unicast control for both downlink and uplink communication may be allocated at the same narrowband location in order to avoid re-tuning or at least limit the amount of re-tuning that a UE may have to do in general operations. Such narrowband control locations within a wideband CC may be referred to a "PCell" or "PControl." Such controls locations may be useful also from the perspective of higher-layer procedures, which deal with the architecture and protocols (MAC, RLC, PDCP), the specification of the Radio Resource Control protocol, and the strategies of Radio Resource Management and the services provided by the physical layer to the upper layers. In one aspect, a UE may monitor a single unicast DL control.

With the various means of providing control subband between common and UE-specific subbands, it becomes useful to provide for efficient ways to manage such control subbands, which may also help improve UE battery consumption. Various aspects of the present disclosure provide for considerations of monitoring various subbands.

In one aspect, a UE may be classified as being in a particular traffic state. For example, the UE may be considered to be in a narrowband traffic state if the UE is not actively involved in uplink or downlink unicast operations. Additionally, the UE may be considered to be in a narrowband traffic state if the UE is actively involved in uplink or downlink unicast operations but without a wider data bandwidth. On the other hand, the UE may be considered to be in a wideband traffic state if the UE is currently involved in active unicast operations with wider data bandwidths. In various aspects of the present disclosure, it may be generally preferable for the UE to monitor a single subband for control when operating in a narrowband traffic state. However, the UE may monitor one or multiple subbands for control when operating in a wideband traffic state.

The various aspects described herein include three types of control search spaces: common control search space, primary UE-specific search space (PUEControl), and secondary UE-specific search space (SUEControl). Common control search space provides for carrying broadcasting, paging, and random access related procedures. The common control search space may also carry some UE-specific operations. In an aspect, common control search space may be used for the IDLE mode.

PUEControl generally carries unicast control and basic common control related procedures (e.g., random access response (RAR) related), such as MIB/SIB related procedures. The MIB/SIB related procedures can be tunneled via data channels. In an aspect, PUEControl may be used for subband low power operation with unicast.

SUEControl may carry unicast control for secondary carriers or secondary subbands. In an aspect, SUEControl may be used for wideband mode and capacity expansion.

Generally, a common control subband (or anchor subband) may carry a primary function and a secondary function. Consequently, a common control search space may be primarily used for broadcast/common procedure related operation, but it can also be used for dedicated scheduling as a secondary purpose. Similarly, a UE-specific control subband may be primarily used for dedicated scheduling and UE-specific procedures. At the same time, as a secondary purpose, it may also serve some common procedures, e.g., random access related procedures. As a result, PUEControl and SUEControl may also be used for corresponding primary and secondary purposes.

Figure 5:
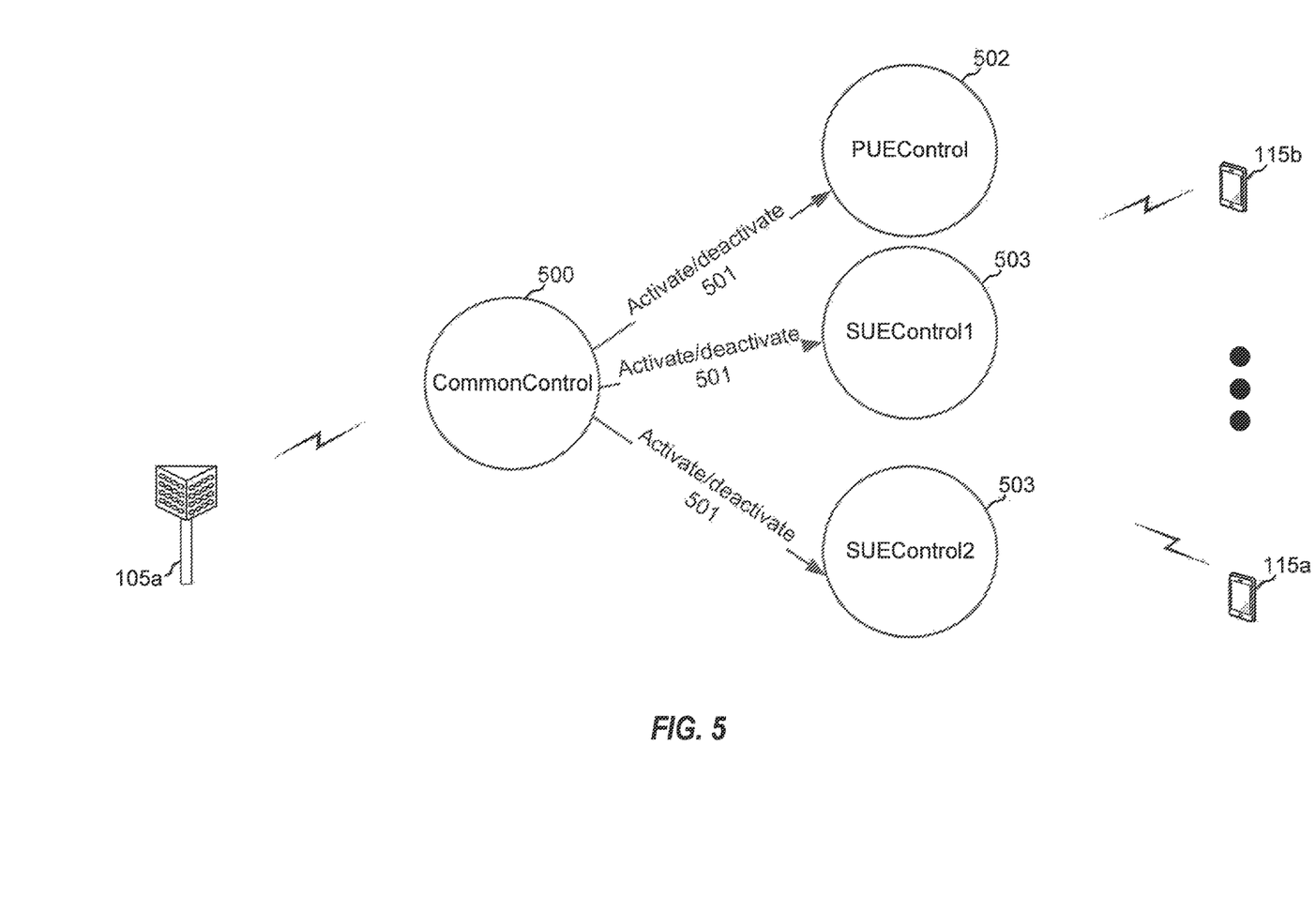
FIG. 5 is a block diagram illustrating a base station and UEs configured according to one aspect of the present disclosure.

FIG. 5 is a block diagram illustrating a base station 105a and UEs 115a and 115b configured according to one aspect of the present disclosure. In one aspect, in a large bandwidth CC, there can be two or more UE-specific control search spaces (e.g., PUEControl 502, SUEControl1 503, and SUEControl2 503).

In making a transition between common and unicast control, common control 500 signaled by base station 105a to one or both of UEs 115a and 115b can activate/deactivate 501 PUEControl 502 and SUEControl 503 (e.g., SUEControl1 503 and SUEControl2 503). The activation/deactivation 501 can be accomplished via a control channel or a medium access control (MAC) control element (CE).

In one aspect, the dynamic nature of the activation signals may be complemented with additional static or semi-static signaling, such as RRC signaling. For example, base station 105a may transmit RRC signals to UEs 115a and 115b identifying subband locations and sizes for common and UE-specific control subbands. When activation or deactivation is determined at a later time, a more dynamic activation signal than an RRC-type signal may be transmitted from base station 105a to either or both of UEs 115a and 115b, as determined, to cause the UE to specifically tune to or from the activated or deactivated subband using the location and size parameters previously received via the RRC signal. The activation signal may then include a 1-bit command to inform UEs 115a and/or 115b to monitor or not monitor the UE-specific subband (e.g., PUEControl 502, SUEControl1 503, and SUEControl2 503).

The common control subband may be monitored by a UE in a set of subframes or slots. Such monitoring may be used to ensure fallback operation. That is, in case of any ambiguity or misalignment between a base station and a UE, the common control subband may be used to ensure a communication between the two sides. The monitoring may be performed sporadically, e.g., in a slot every 40 slots, or regularly, e.g., in every slot for a certain duration.

In one aspect, this different behavior of monitoring of common control subband may depend on UE-specific operation conditions. As an example, a UE in active data exchange may monitor common control subband regularly, while a UE in a discontinuous reception (DRX) off state may monitor a common control subband occasionally.

Figure 6:
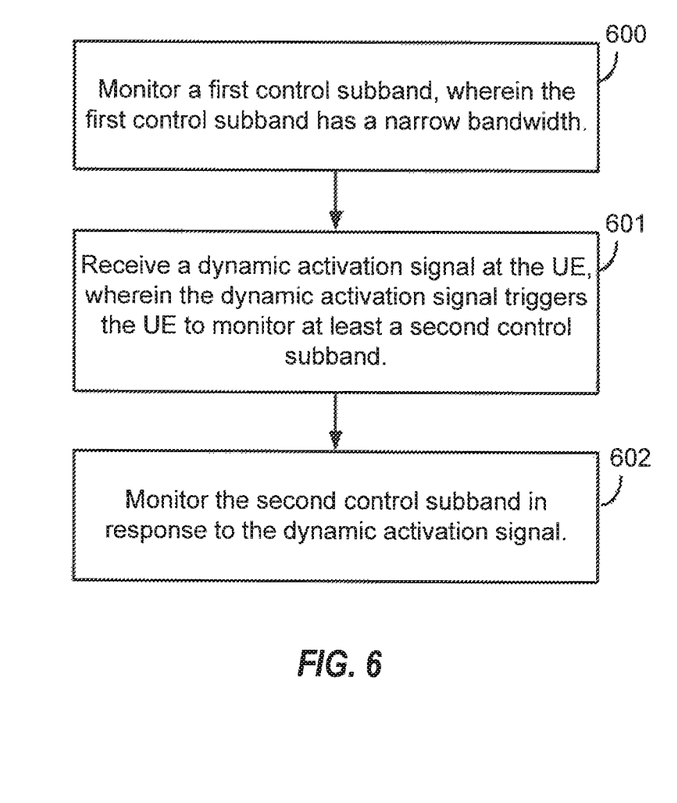
FIG. 6 is a block diagram illustrating example blocks executed to implement one aspect of the present disclosure.
Figure 8:
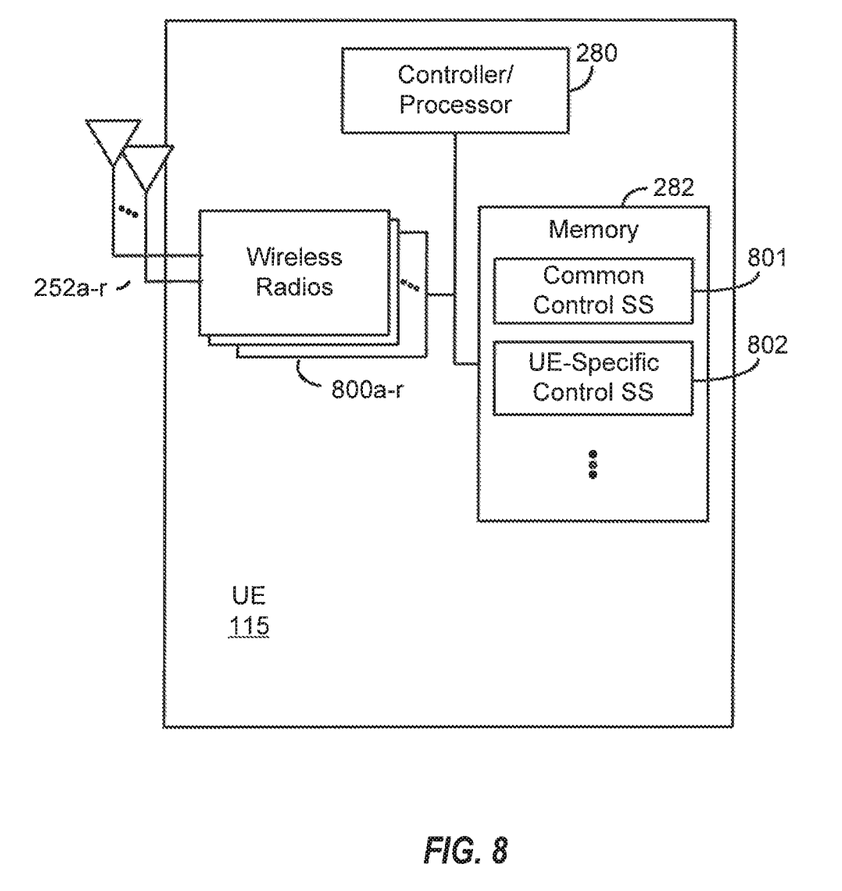
FIG. 8 is a block diagram illustrating a UE configured according to one aspect of the present disclosure.

FIG. 6 is a block diagram illustrating example blocks executed to implement one aspect of the present disclosure. The example blocks will also be described with respect to UE 115 as illustrated in FIG. 8. FIG. 8 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 800a-r and antennas 252a-r. Wireless radios 800a-r includes various components and hardware, as illustrated in FIG. 2 for UE 115, including modulator/demodulators 254a-r, MIMO detector 256, receive processor 258, transmit processor 264, and TX MIMO processor 266.

At block 600, a UE monitors a first control subband, wherein the first control subband has a narrow bandwidth in a wider system bandwidth. For example, a UE, such as UE 115, in a narrowband traffic state may monitor a narrowband common control subband. That is, UE 115, under control of controller/processor 280, may monitor the narrowband common control subband, where the location and size of the common control subband is stored in common control search space 801 of memory 282. As another example, when in a wideband traffic state, the UE may still be monitoring a narrowband common control subband.

At block 601, the UE receives a dynamic activation signal, wherein the dynamic activation signal triggers the UE to monitor at least a second control subband. For example, UE 115 may receive an activation signal dynamically via a control channel or MAC CE activating at least another subband for UE 115 to monitor. The activation signal may be received at UE 115 via antennas 252a-r and wireless radios 800a-r, under control of controller/processor 280.

At block 602, the UE monitors the second control subband in response to the dynamic activation signal. For example, when UE 115 is in the narrowband traffic state, the activation signal may trigger UE 115 to begin monitoring a narrowband hybrid control subband that may include both common control and UE-specific control subbands. For instance, UE 115 may access the location and size of the hybrid control subband in common control search space 801 of memory 282 (FIG. 8). Alternatively, as another example, the activation signal may direct a wideband traffic state UE, such as UE 115, to begin monitoring multiple UE-specific control subbands, such as one or more PUEControl and SUEControl subbands. The location and size of such UE-specific control subbands are also accessed in memory 282 in UE-specific control search space 802 (FIG. 8). As noted above, in one aspect, UE 115 may receive the location and size of the UE-specific control subbands stored in UE-specific control search space 802 via semi-static message from a base station well in advance of receiving the dynamic activation signal at block 601.

Figure 7:
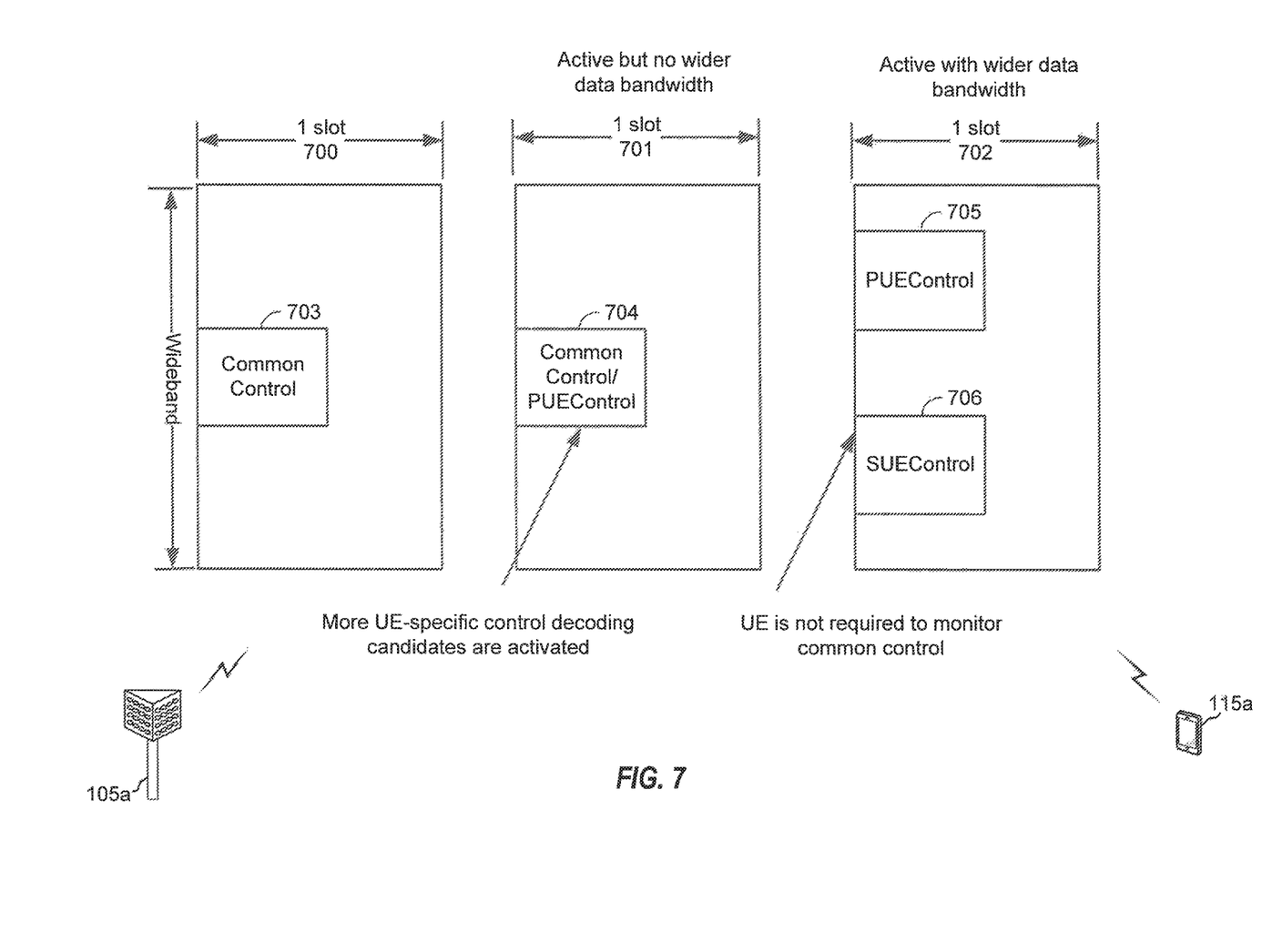
FIG. 7 is a block diagram illustrating a base station and a UE configured according to one aspect of the present disclosure.

FIG. 7 is a block diagram illustrating a base station 105a and a UE 115a configured according to one aspect of the present disclosure. Base station 105a may communicate with UE 115a using a wideband CC. While in the narrowband traffic state (e.g., when UE 115a is not actively engaged in downlink or uplink unicast operations or actively engaged in downlink or uplink unicast but without wideband data transmissions), UE 115a only monitors common control subband 703 within slot 700 or combined common control/PUEControl subband 704 within slot 701.

When UE 115a is actively involved in unicast operation with wideband data transmissions, UE 115a, now in a wideband traffic state, may be activated to monitor PUEControl subband 705 and SUEControl subband 706 within slot 702. In this scenario, UE 115a may not be required to monitor common control subband 703 at least in some subframes or slots. For single, wideband CC, two or more UE search spaces may be used to monitor two or more UE-specific control subbands (e.g., PUEControl subband 705, SUEControl subband 706) for increased flexibility, in a manner similar CA.

As noted above, the dynamic activation signal that triggers a UE, such as UE 115a, to begin monitoring the UE-specific search spaces may operate in conjunction with semi-static messaging for providing location and size of the control subband. For example, at a prior time in FIG. 7, base station 105a may send a semi-static message to UE 115a, such as through a direct RRC message or broadcast in a system information message (e.g., MIB, SIB). Thus, at the later time, when base station 105a transmits the dynamic activation message to UE 115a, it may be a short message, such as a 1-bit flag, that triggers UE 115a to begin monitoring one or both of PUEControl subband 705 and SUEControl subband 706. UE 115a will already have the location and size of PUEControl subband 705 and SUEControl subband 706 obtained from the previous semi-static message.

As described in the example aspect illustrated in FIG. 7, a wideband CC may carrier two or more UE-specific control subbands (e.g., PUEControl subband 705 and SUEControl subband 706). The presence of two or more UE-specific control subbands may be supported according to the system bandwidth beyond a certain threshold (e.g., 80 MHz or higher). Each UE-specific control subband may schedule its own PDSCH transmission. For example, PUEControl subband 705 and SUEControl subband 706 may each schedule their own PDSCH transmission in a later, single slot from base station 105a. Thus, a UE, such as UE 115a, may be scheduled to receive two or more PDSCH transmissions in a single slot of a wideband CC, but may only be scheduled for a single PUSCH transmission in a slot via one of the control subbands. Such a configuration is similar to CA operations. Fast activation/deactivation of such subband monitoring (e.g., via common control subband) can be performed to dynamically manage the number of such active control subbands.

It should be noted that hybrid automatic repeat request (HARQ) feedback may take into account the maximum possible parallel PDSCH transmissions in a given slot. This maximum number may be configured or hard-coded per cell or per UE, for example, up to two PDSCH transmissions per cell. The number of HARQ feedback bits may be determined based on a higher-layer configuration (e.g., a number of maximum possible parallel PDSCH transmissions in a wideband CC, a downlink transmission mode, etc.), and/or a dynamic indication (e.g., an indicator in a DCI of a number of scheduled DL transmissions, etc.). Other implementations may provide configuration of a higher number of PDSCH transmissions per cell.

It should also be noted that there can also be a maximum possible parallel PUSCH transmissions in a given slot. This maximum number may be configured or hard-coded per cell or per UE, for example, up to two PUSCH transmissions per cell. This maximum number may be the same as the downlink, or alternatively, separately managed from the downlink.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 6 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
monitoring, by a user equipment (UE), a first control subband, wherein the first control subband has a bandwidth that is narrower than a system bandwidth;
receiving a dynamic activation signal at the UE, wherein the dynamic activation signal triggers the UE to monitor at least a second control subband; and
monitoring the at least the second control subband in response to the dynamic activation signal,
wherein a first subband type of the first control subband includes a common control search space, and
wherein a second subband type of the at least the second control subband includes one or more of:
a primary UE-specific search space;
a secondary UE-specific search space;
a plurality of UE-specific search spaces; or
combinations thereof.

2. The method of claim 1, further including:
monitoring both the first control subband and the at least the second control subband.

3. A method of wireless communication, comprising:
monitoring, by a user equipment (UE), a first control subband, wherein the first control subband has a bandwidth that is narrower than a system bandwidth;
receiving a dynamic activation signal at the UE, wherein the dynamic activation signal triggers the UE to monitor at least a second control subband; and
monitoring the at least the second control subband in response to the dynamic activation signal,
wherein at least one of the first control subband or the at least the second control subband comprises a search space with a primary function and a secondary function, wherein the primary function is associated with at least one of a broadcast function, a groupcast function, a common scheduling function, a dedicated scheduling function, or combinations thereof, and
wherein the secondary function is a different function from the primary function and is associated with at least one of: the broadcast function, the groupcast function, the common scheduling function, the dedicated scheduling function, or combinations thereof.

4. The method of claim 1, wherein the first control subband is monitored in a selected set of slots.

5. The method of claim 1, further including:
determining a traffic state of the UE, wherein the traffic state includes one of:
a narrowband state, wherein the UE is one of: not actively engaged in unicast operations or actively engaged in unicast operations without a wide data bandwidth; or
a wideband state, wherein the UE is actively involved in unicast operations including the wide data bandwidth,
wherein the subband type of the at least the second control subband is determined according to the traffic state of the UE.

6. The method of claim 1, further including:
receiving, at the UE, a semi-static signal identifying a location and size of the at least the second control subband, wherein the UE tunes to the location of the at least the second control subband in response to the receiving the dynamic activation signal.

7. The method of claim 6,
wherein the dynamic activation signal may be received via one of: a control channel transmission or a medium access control (MAC) control element (CE), and
wherein the semi-static signal may be received via a radio resource control (RRC) message.

8. The method of claim 1, wherein component carrier over which the UE performs the monitoring and the receiving is a wideband component carrier, and the subband type includes a plurality of UE-specific search spaces.

9. The method of claim 8, further including:
receiving scheduling for each of the plurality of UE-specific search spaces, wherein the scheduling schedules one of: downlink transmissions or uplink transmissions for a same slot within the wideband component carrier.

10. The method of claim 9, further including:
identifying a maximum number of transmissions in the same slot.

11. An apparatus configured for wireless communication, comprising:
means for monitoring, by a user equipment (UE), a first control subband, wherein the first control subband has a bandwidth that is narrower than a system bandwidth;
means for receiving a dynamic activation signal at the UE, wherein the dynamic activation signal triggers the UE to monitor at least a second control subband; and
means for monitoring the at least the second control subband in response to the dynamic activation signal,
wherein at least one of the first control subband or the at least the second control subband comprises a search space with a primary function and a secondary function, wherein the primary function is associated with at least one of a broadcast function, a groupcast function, a common scheduling function, a dedicated scheduling function, or combinations thereof, and
wherein the secondary function is a different function from the primary function and is associated with at least one of: the broadcast function, the groupcast function, the common scheduling function, the dedicated scheduling function, or combinations thereof.

12. An apparatus configured for wireless communication, comprising:
means for monitoring, by a user equipment (UE), a first control subband, wherein the first control subband has a bandwidth that is narrower than a system bandwidth;
means for receiving a dynamic activation signal at the UE, wherein the dynamic activation signal triggers the UE to monitor at least a second control subband; and
means for monitoring the at least the second control subband in response to the dynamic activation signal,
wherein a subband type of the at least the second control subband includes one or more of:
a common control search space;
a primary UE-specific search space;
a secondary UE-specific search space;
a plurality of UE-specific search spaces; or
combinations thereof.

13. A non-transitory computer-readable medium having program code recorded thereon, the program code comprising:
program code executable by a computer for causing the computer to monitor, by a user equipment (UE), a first control subband, wherein the first control subband has a bandwidth that is narrower than a system bandwidth;
program code executable by the computer for causing the computer to receive a dynamic activation signal at the UE, wherein the dynamic activation signal triggers the UE to monitor at least a second control subband; and
program code executable by the computer for causing the computer to monitor the at least the second control subband in response to the dynamic activation signal,
wherein a subband type of the at least the second control subband includes one or more of:
a common control search space;
a primary UE-specific search space;
a secondary UE-specific search space;
a plurality of UE-specific search spaces; or
combinations thereof.

14. A non-transitory computer-readable medium having program code recorded thereon, the program code comprising:
program code executable by a computer for causing the computer to monitor, by a user equipment (UE), a first control subband, wherein the first control subband has a bandwidth that is narrower than a system bandwidth;
program code executable by the computer for causing the computer to receive a dynamic activation signal at the UE, wherein the dynamic activation signal triggers the UE to monitor at least a second control subband; and
program code executable by the computer for causing the computer to monitor the at least the second control subband in response to the dynamic activation signal,
wherein at least one of the first control subband or the at least the second control subband comprises a search space with a primary function and a secondary function,
wherein the primary function is associated with at least one of a broadcast function, a groupcast function, a common scheduling function, or a dedicated scheduling function, and
wherein a secondary function is different function from the primary function and is associated with at least one of: the broadcast function, the groupcast function, the common scheduling function, or the dedicated scheduling function.

15. The non-transitory computer-readable medium of claim 13, wherein the first control subband is monitored in a predetermined set of slots.

16. An apparatus configured for wireless communication, the apparatus comprising:
   at least one processor; and
   a memory coupled to the at least one processor,
   wherein the at least one processor is configured:
      to monitor, by a user equipment (UE), a first control subband, wherein the first control subband has a bandwidth that is narrower than a system bandwidth;
      to receive a dynamic activation signal at the UE, wherein the dynamic activation signal triggers the UE to monitor at least a second control subband; and
      to monitor the at least the second control subband in response to the dynamic activation signal,
   wherein a subband type of the at least the second control subband includes one or more of:
      a common control search space;
      a primary UE-specific search space;
      a secondary UE-specific search space;
      a plurality of UE-specific search spaces; or
      combinations thereof.

17. The apparatus of claim 16, further including configuration of the at least one processor to monitor both the first control subband and the at least the second control subband.

18. The apparatus of claim 16, wherein at least one of the first control subband or the at least the second control subband comprises a search space with a primary function and a secondary function.

19. An apparatus configured for wireless communication, the apparatus comprising:
   at least one processor; and
   a memory coupled to the at least one processor,
   wherein the at least one processor is configured:
      to monitor, by a user equipment (UE), a first control subband, wherein the first control subband has a bandwidth that is narrower than a system bandwidth;
      to receive a dynamic activation signal at the UE, wherein the dynamic activation signal triggers the UE to monitor at least a second control subband; and
      to monitor the at least the second control subband in response to the dynamic activation signal,
   wherein at least one of the first control subband or the at least the second control subband comprises a search space with a primary function and a secondary function,
   wherein the primary function is associated with at least one of a broadcast function, a groupcast function, a common scheduling function, a dedicated scheduling function, or combinations thereof, and
   wherein the secondary function is a different function from the primary function and is associated with at least one of: the broadcast function, the groupcast function, the common scheduling function, the dedicated scheduling function, or combinations thereof.

20. The apparatus of claim 16, wherein the first control subband is monitored in a selected set of slots.

21. The apparatus of claim 16, further including configuration of the at least one processor:
   to determine a traffic state of the UE, wherein the traffic state includes one of:
      a narrowband state, wherein the UE is one of: not actively engaged in unicast operations or actively engaged in unicast operations without a wide data bandwidth; or
      a wideband state, wherein the UE is actively involved in unicast operations including the wide data bandwidth,
   wherein the subband type of the at least the second control subband is determined according to the traffic state of the UE.

22. The apparatus of claim 16, further including configuration of the at least one processor to receive, at the UE, a semi-static signal identifying a location and size of the at least the second control subband, wherein the UE tunes to the location of the at least the second control subband in response to the receipt of the dynamic activation signal.

23. The apparatus of claim 22,
   wherein the dynamic activation signal may be received via one of: a control channel transmission or a medium access control (MAC) control element (CE), and
   wherein the semi-static signal may be received via a radio resource control (RRC) message.

24. The apparatus of claim 16, wherein component carrier over which the UE executes the configuration of the at least one processor to monitor and the configuration of the at least one processor to receive is a wideband component carrier, and the subband type includes a plurality of UE-specific search spaces.

25. The apparatus of claim 24, further including configuration of the at least one processor to receive scheduling for each of the plurality of UE-specific search spaces, wherein the program code executable by the computer for causing the computer to schedule schedules one of: downlink transmissions or uplink transmissions for a same slot within the wideband component carrier.

26. The apparatus of claim 25, further including configuration of the at least one processor to identify a maximum number of transmissions in the same slot.

* * * * *